United States Patent
De Palo et al.

(10) Patent No.: US 8,153,217 B2
(45) Date of Patent: Apr. 10, 2012

(54) REINFORCED POLYPROPYLENE PIPE

(75) Inventors: Roberto De Palo, Ferrara (IT); Mario Riccini, Perugia (IT)

(73) Assignee: Basell Poliolefine Italia s.r.l., Milan (IT)

( * ) Notice: Subject to any disclaimer, the term of this patent is extended or adjusted under 35 U.S.C. 154(b) by 474 days.

(21) Appl. No.: 11/919,094

(22) PCT Filed: Mar. 24, 2006

(86) PCT No.: PCT/EP2006/061041
§ 371 (c)(1),
(2), (4) Date: Oct. 23, 2007

(87) PCT Pub. No.: WO2006/114358
PCT Pub. Date: Nov. 2, 2006

(65) Prior Publication Data
US 2009/0304968 A1    Dec. 10, 2009

Related U.S. Application Data

(60) Provisional application No. 60/679,167, filed on May 9, 2005.

(30) Foreign Application Priority Data

Apr. 28, 2005   (EP) .................................... 05103507

(51) Int. Cl.
*B32B 1/08*      (2006.01)
*B32B 23/00*     (2006.01)
(52) U.S. Cl. ..................... 428/36.9; 428/34.1; 428/34.2; 428/35.7; 428/35.9

(58) Field of Classification Search ................. 428/34.1, 428/34.2, 35.7, 35.9, 36.9
See application file for complete search history.

(56) References Cited

U.S. PATENT DOCUMENTS 3,354,239 A  *  11/1967  Short .............................. 525/88
(Continued)

FOREIGN PATENT DOCUMENTS
EP          45977         2/1982
(Continued)

*Primary Examiner* — Marc Patterson
(74) *Attorney, Agent, or Firm* — Dilworth IP LLC

(57) ABSTRACT

A single- or multilayer threaded pipe, wherein at least one layer is produced from a polyolefin composition comprising (percentages express on the basis of the sum of components (A) and (B)): (A) 65-90 wt % of a heterophasic polypropylene composition comprising (percentages expressed on the basis of the polypropylene composition): (1) 65-95 wt % of a propylene polymer selected from propylene homopolymer and co- and terpolymers of propylene with a comonomer selected from ethylene, a C4-C10 alpha-olefin and a mixture thereof, said polymer containing 0.1-10 wt % of comonomer units, being insoluble in xylene at 25° C. in an amount over 85 wt %, having a polydispersity index ranging from 4 to 13 and an intrinsic viscosity ($[\eta]1$) value of over 2.2 dl/g; and (2) 5-35 wt % of an olefin polymer of ethylene with propylene or a C4-C10 alpha-olefin having an ethylene content ranging from 15 to 85 wt % and an intrinsic viscosity of the fraction soluble in xylene ($[\eta]2$) of at least 1.4 dl/g; wherein the ratio of the intrinsic viscosity value of propylene polymer (1) to that of olefin polymer (2) ($[\eta]/[\eta]2$) ranges from 0.45 to 1.6; and (B) 10-35 wt % of a at least one filler selected among calcium carbonate, talc, wollastonite or mixtures thereof.

16 Claims, 1 Drawing Sheet

U.S. PATENT DOCUMENTS

| | | | |
|---|---|---|---|
| 4,399,054 A | 8/1983 | Ferraris et al. | 502/125 |
| 4,469,648 A | 9/1984 | Ferraris et al. | 264/9 |
| 5,145,819 A | 9/1992 | Winter et al. | 502/117 |
| 5,324,800 A | 6/1994 | Welborn, Jr. et al. | 526/160 |
| 6,127,304 A | 10/2000 | Sacchetti et al. | 502/125 |
| 6,300,420 B1 | 10/2001 | Jääskeläinen et al. | 525/240 |
| 6,323,152 B1 | 11/2001 | Sacchetti et al. | 502/169 |
| 6,407,028 B1 | 6/2002 | Sacchetti et al. | 502/172 |
| 6,433,087 B1 * | 8/2002 | Ebner et al. | 525/191 |
| 6,437,061 B1 | 8/2002 | Sacchetti et al. | 526/124.2 |
| 6,461,703 B1 | 10/2002 | Rigosi | 428/36.9 |
| 6,503,993 B1 | 1/2003 | Huovinen et al. | 526/348.1 |
| 6,686,307 B2 | 2/2004 | Sacchetti et al. | 502/169 |
| 6,689,845 B1 | 2/2004 | Govoni et al. | 526/65 |
| 6,818,187 B2 | 11/2004 | Govoni et al. | 422/131 |
| 6,818,583 B1 | 11/2004 | Morini et al. | 502/103 |
| 6,825,309 B2 | 11/2004 | Morini et al. | 526/131 |
| 6,933,347 B2 | 8/2005 | Delaite et al. | 525/240 |
| 7,019,044 B2 * | 3/2006 | Debras et al. | 522/158 |
| 7,169,871 B2 | 1/2007 | Morini et al. | 526/351 |
| 2002/0035210 A1 | 3/2002 | Silvestri et al. | 525/240 |
| 2002/0156194 A1 * | 10/2002 | Pelliconi et al. | 525/240 |
| 2003/0034650 A1 * | 2/2003 | Krauss et al. | 285/206 |
| 2007/0117932 A1 | 5/2007 | De Palo et al. | 525/240 |

FOREIGN PATENT DOCUMENTS

| | | |
|---|---|---|
| EP | 129368 | 12/1984 |
| EP | 361493 | 4/1990 |
| EP | 361494 | 4/1990 |
| EP | 373660 | 6/1990 |
| EP | 395083 | 10/1990 |
| EP | 416815 | 3/1991 |
| EP | 420436 | 4/1991 |
| EP | 485823 | 5/1992 |
| EP | 643066 | 3/1995 |
| EP | 728769 | 8/1996 |
| EP | 782587 | 7/1997 |
| EP | 1272533 | 9/2001 |
| EP | 1260546 | 11/2002 |
| EP | 1493377 | 1/2005 |
| EP | 671404 | 9/2005 |
| EP | 1632529 | 3/2006 |
| FR | 2834326 | 7/2003 |
| GB | 1439370 | 6/1976 |
| GB | 1499863 | 2/1978 |
| WO | 91/04257 | 4/1991 |
| WO | 98/44009 | 10/1998 |
| WO | 99/21916 | 5/1999 |
| WO | 00/02929 | 1/2000 |
| WO | 00/63261 | 10/2000 |
| WO | 02/30998 | 4/2002 |
| WO | 02/38670 | 5/2002 |
| WO | 2005/014713 | 2/2005 |

* cited by examiner

REINFORCED POLYPROPYLENE PIPE

The present invention relates to reinforced polypropylene pipes suitable for in-pressure as well as for non-pressure pipe applications, such as underground drain and well pipes for hot and cold waters.

Because of its good processability at low production costs and high physical-mechanical performances, PVC is the most dominant material used for pipes and fittings. However, disadvantages connected to the use of PVC in hot-water and/or drinking supply lines acknowledges for the research of alternative solutions. Polyethylene and polypropylene proved to be effective in providing a suitable alternative.

It is known that propylene polymers suitable for pipes do not normally have good processability.

A propylene polymer composition for pipes, endowed with good processability is disclosed in the International Patent Application WO2005/014713. Said composition comprises:
(1) 65-95% of a crystalline propylene polymer selected from propylene homopolymer and random co- and terpolymer of propylene with 0.1-10% of an alpha-olefin selected from ethylene, a $C_4$-$C_{10}$ alpha-olefin and a mixture thereof, the said polymer being insoluble in xylene at ambient temperature in an amount over 85% and having a polydispersity index ranging from 4 to 13 and an intrinsic viscosity ($[\eta]$) value of over 2.2 dl/g; and
(2) 5-35% of an elastomeric olefin polymer of ethylene with a $C_3$-$C_{10}$ alpha-olefin and optionally a diene, having an ethylene content ranging from 15 to 85% and an intrinsic viscosity ($[\eta]$) value of at least 1.4 dl/g;
wherein the ratio of the intrinsic viscosity value of crystalline polymer (1) to that of elastomeric polymer (2) ranges from 0.45 to 1.6.

Due to its good resistance properties, said propylene polymer composition is suitable for the manufacturing of socket pipes. However, for pipes to be used in buried applications, such as well pipes, threaded connections are highly preferred because of lower digging costs and easier flowing of the pipe into the dug holes.

It has been surprisingly found that by compounding the above-mentioned propylene polymer composition with specific amounts of calcium carbonate, talc or wollastonite, single- or multilayer threaded polypropylene pipes can be obtained which exhibit an unexpectedly high unthreading strength, while retaining high stiffness and good impact resistance.

The present invention therefore provides a single- or multilayer threaded pipe, wherein at least one layer is produced from a polyolefin composition comprising (percentages express on the basis of the sum of components (A) and (B)):
(A) 65-90 wt % of a heterophasic polypropylene composition comprising (percentages expressed on the basis of the polypropylene composition):
  (1) 65-95 wt % of a propylene polymer selected from propylene homopolymer and co- and terpolymers of propylene with a comonomer selected from ethylene, a $C_4$-$C_{10}$ alpha-olefin and a mixture thereof, said polymer containing 0.1-10 wt % of comonomer units, being insoluble in xylene at 25° C. in an amount over 85 wt %, having a polydispersity index ranging from 4 to 13 and an intrinsic viscosity ($[\eta]_1$) value of over 2.2 dl/g; and
  (2) 5-35 wt % of an olefin polymer of ethylene with propylene or a $C_4$-$C_{10}$ alpha-olefin having an ethylene content ranging from 15 to 85 wt % and an intrinsic viscosity of the fraction soluble in xylene ($[\eta]_2$) of at least 1.4 dl/g;
  wherein the ratio of the intrinsic viscosity value of propylene polymer (1) to that of olefin polymer (2) ($[\eta]_1/[\eta]_2$) ranges from 0.45 to 1.6; and
(B) 10-35 wt % of a at least one filler selected among calcium carbonate, talc, wollastonite or mixtures thereof.

The heterophasic polypropylene composition preferably comprises 85-92 wt % the propylene polymer (1) and of 8-15 wt % of the olefin polymer (2).

The $C_4$-$C_{10}$ alpha-olefin in component (1) and (2) of the heterophasic polypropylene composition can be linear or branched and is preferably selected from 1-butene, 1-pentene, 4-methyl-1-pentene, 1-hexene and 1-octene.

Preferably, the component (1) is insoluble in xylene at 25° C. in an amount over 90 wt %, more preferably over 95 wt %. The amount of polymer insoluble in xylene is determined according to the method described below.

When the component (1) is a copolymer of propylene with a $C_4$-$C_{10}$ alpha-olefin or a terpolymer propylene/ethylene/$C_4$-$C_{10}$ alpha-olefin, typically the $C_4$-$C_{10}$ alpha-olefin content is from 0.1 to less than 2.0 wt %. According to a preferred embodiment, the component (1) is an isotactic propylene homopolymer.

The component (2) may optionally comprise a conjugated or un-conjugated diene, such as butadiene, 1,4-hexadiene, 1,5-hexadiene and ethylidene-norbornene-1. When present, the diene is typically in an amount from 0.5 to 10 wt % with respect to the weight of the component (2).

Preferably, the component (2) is an ethylene/propylene copolymer with 20 to 80 wt %, more preferably 35 to 60 wt % of ethylene units.

The heterophasic polypropylene composition (A) has typically the following set of physical-mechanical properties:
- MFR (230° C., 5 Kg/ISO 1133) less than 4.0 g/10 min, preferably ranging from 0.5 to 2.0 g/10 min; and/or
- MFR (230° C., 2.16 Kg/ISO 1133) less than 5.0 g/10 min, preferably ranging from 0.01 to 1.5 g/10 min, more preferably from 0.5 to 1.0 g/10 min; and/or
- Flexural Modulus (ISO 178, after 7 days) higher than 1600 MPa, preferably higher than 1800 MPa, more preferably ranging from 1800 to 2400 MPa; and/or
- Notched Izod Impact Strength (ISO 180/1A, after 7 days) at −20° C. higher than 5 kJ/m$^2$, preferably ranging from 5 to 20 kJ/m$^2$; and/or
- Tensile Stress at Yield (50 mm/min/ISO 527-1, -2, after 7 days) higher than 29 MPa, preferably ranging from 29 to 40 MPa; and/or
- Tensile Elongation at Yield (50 mm/min/ISO 527-1, -2, after 7 days) higher than 5%, preferably higher than 8%, more preferably ranging from 8 to 20%.

The above-mentioned tensile properties are measured on injection-molded specimens prepared according to the methods described hereinbelow.

The heterophasic polypropylene composition (A) can be prepared by sequential polymerization in at least two stages, with each subsequent polymerization stage being conducted in the presence of the polymeric material formed in the immediately preceding polymerization reaction, wherein the homo-, co- or terpolymer (1) is normally prepared in at least one first polymerization stage and the copolymer (2) is normally prepared in at least one second polymerization stage.

Each polymerization stage is carried out in presence of a metallocene or, preferably, a highly stereospecific heterogeneous Ziegler-Natta catalyst. The Ziegler-Natta catalysts suitable for producing the heterophasic polypropylene composition (A) comprise a solid catalyst component comprising at least one titanium compound having at least one titanium-halogen bond and at least an electron-donor compound (internal donor), both supported on magnesium chloride. The Ziegler-Natta catalysts systems further comprise an organo-aluminum compound as essential co-catalyst and optionally an external electron-donor compound.

Suitable catalysts systems are described in the European patents EP45977, EP361494, EP728769, EP1272533 and in the international patent application WO00/63261.

Preferably, the solid catalyst component comprises Mg, Ti, halogen and an electron donor selected from succinates of formula (I):

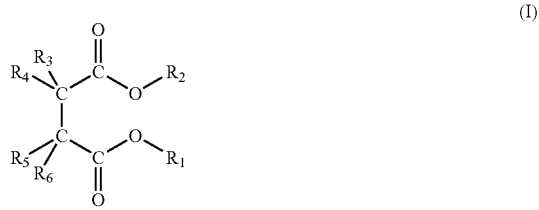

(I)

wherein the radicals $R_1$ and $R_2$, equal to or different from each other, are a $C_1$-$C_{20}$ linear or branched alkyl, alkenyl, cycloalkyl, aryl, arylalkyl or alkylaryl group, optionally containing heteroatoms; the radicals $R_3$ to $R_6$ equal to or different from each other, are hydrogen or a $C_1$-$C_{20}$ linear or branched alkyl, alkenyl, cycloalkyl, aryl, arylalkyl or alkylaryl group, optionally containing heteroatoms, and the radicals $R_3$ to $R_6$ which are joined to the same carbon atom can be linked together to form a cycle.

$R_1$ and $R_2$ are preferably $C_1$-$C_8$ alkyl, cycloalkyl, aryl, arylalkyl and alkylaryl groups. Particularly preferred are the compounds in which $R_1$ and $R_2$ are selected from primary alkyls and in particular branched primary alkyls. Examples of suitable $R_1$ and $R_2$ groups are methyl, ethyl, n-propyl, n-butyl, isobutyl, neopentyl, 2-ethylhexyl. Particularly preferred are ethyl, isobutyl, and neopentyl.

One of the preferred groups of compounds described by the formula (I) is that in which $R_3$ to $R_5$ are hydrogen and $R_6$ is a branched alkyl, cycloalkyl, aryl, arylalkyl and alkylaryl radical having from 3 to 10 carbon atoms. Another preferred group of compounds within those of formula (I) is that in which at least two radicals from $R_3$ to $R_6$ are different from hydrogen and are selected from $C_1$-$C_{20}$ linear or branched alkyl, alkenyl, cycloalkyl, aryl, arylalkyl or alkylaryl group, optionally containing heteroatoms. Particularly preferred are the compounds in which the two radicals different from hydrogen are linked to the same carbon atom. Furthermore, also the compounds in which at least two radicals different from hydrogen are linked to different carbon atoms, that is $R_3$ and $R_5$ or $R_4$ and $R_6$ are particularly preferred.

According to a preferred method, the solid catalyst component can be prepared by reacting a titanium compound of formula Ti(OR)$_{n-y}$X$_y$, where n is the valence of titanium and y is a number between 1 and n, preferably TiCl$_4$, with a magnesium chloride deriving from an adduct of formula MgCl$_2 \cdot$pROH, where p is a number between 0.1 and 6, preferably from 2 to 3.5, and R is a hydrocarbon radical having 1-18 carbon atoms. The adduct can be suitably prepared in spherical form by mixing alcohol and magnesium chloride in the presence of an inert hydrocarbon immiscible with the adduct, operating under stirring conditions at the melting temperature of the adduct (100-130° C.). Then, the emulsion is quickly quenched, thereby causing the solidification of the adduct in form of spherical particles. Examples of spherical adducts prepared according to this procedure are described in U.S. Pat. Nos. 4,399,054 and 4,469,648. The so obtained adduct can be directly reacted with the Ti compound or it can be previously subjected to thermal controlled dealcoholation (80-130° C.) so as to obtain an adduct in which the number of moles of alcohol is generally lower than 3, preferably between 0.1 and 2.5. The reaction with the Ti compound can be carried out by suspending the adduct (dealcoholated or as such) in cold TiCl$_4$ (generally 0° C.); the mixture is heated up to 80-130° C. and kept at this temperature for 0.5-2 hours. The treatment with TiCl$_4$ can be carried out one or more times. The internal donor can be added during the treatment with TiCl$_4$ and the treatment with the electron donor compound can be repeated one or more times. Generally, the succinate of formula (I) is used in molar ratio with respect to the MgCl$_2$ of from 0.01 to 1 preferably from 0.05 to 0.5. The preparation of catalyst components in spherical form is described for example in European patent application EP-A-395083 and in the International patent application WO98/44009. The solid catalyst components obtained according to the above method show a surface area (by B.E.T. method) generally between 20 and 500 m$^2$/g and preferably between 50 and 400 m$^2$/g, and a total porosity (by B.E.T. method) higher than 0.2 cm$^3$/g preferably between 0.2 and 0.6 cm$^3$/g. The porosity (Hg method) due to pores with radius up to 10.000 Å generally ranges from 0.3 to 1.5 cm$^3$/g, preferably from 0.45 to 1 cm$^3$/g.

The organo-aluminum compound is preferably an alkyl-Al selected from the trialkyl aluminum compounds such as for example triethylaluminum, triisobutylaluminum, tri-n-butylaluminum, tri-n-hexylaluminum, tri-n-octylaluminum. It is also possible to use mixtures of trialkylaluminum's with alkylaluminum halides, alkylaluminum hydrides or alkylaluminum sesquichlorides such as AlEt$_2$Cl and Al$_2$Et$_3$Cl$_3$.

Preferred external electron-donor compounds include silicon compounds, ethers, esters such as ethyl 4-ethoxybenzoate, amines, heterocyclic compounds and particularly 2,2,6,6-tetramethyl piperidine, ketones and the 1,3-diethers. Another class of preferred external donor compounds is that of silicon compounds of formula $R_a^5 R_b^6 Si(OR^7)_c$, where a and b are integer from 0 to 2, c is an integer from 1 to 3 and the sum (a+b+c) is 4; $R^5$, $R^6$, and $R^7$, are alkyl, cycloalkyl or aryl radicals with 1-18 carbon atoms optionally containing heteroatoms. Particularly preferred are methylcyclohexyldimethoxysilane, diphenyldimethoxysilane, methyl-t-butyldimethoxysilane, dicyclopentyldimethoxysilane, 2-ethylpiperidinyl-2-t-butyldimethoxysilane and 1,1,1,trifluoropropyl-2-ethylpiperidinyl-dimethoxysilane and 1,1,1, trifluoropropyl-metil-dimethoxysilane. The external electron donor compound is used in such an amount to give a molar ratio between the organo-aluminum compound and said electron donor compound of from 0.1 to 500.

The polymerization process can be carried out in gas phase and/or in liquid phase, in continuous or batch reactors, such as fluidized bed or slurry reactors. For example, it is possible to carry out the polymerization of the propylene polymer (1) in liquid phase, using liquid propylene as diluent, while the copolymerization stage to obtain the component (2) is carried out in gas phase, without intermediate stages except for the partial degassing of the monomers. Alternatively, all the sequential polymerization stages can be carried out in gas phase. The reaction time, temperature and pressure of the polymerization steps are not critical, however the temperature for the preparation of component (1) and (2), that can be the same or different, is usually from 50° C. to 120° C. The polymerization pressure preferably ranges from 0.5 to 12 MPa if the polymerization is carried out in gas-phase. The catalytic system can be pre-contacted (pre-polymerized) with small amounts of olefins. The molecular weight of the propylene polymer composition is regulated by using known regulators, such as hydrogen.

According to a preferred embodiment, the propylene polymer (1) is produced by a gas-phase polymerization process carried out in at least two interconnected polymerization zones, said polymerization process being described in the European patent EP 782587, and the component (2) is produced by a gas-phase polymerization process.

The process is carried out in a first and in a second interconnected polymerization zone to which propylene, ethylene and/or alpha-olefins are fed in the presence of the catalyst system and from which the polymer produced is discharged. The growing polymer particles flow through the first of said polymerization zones (riser) under fast fluidization conditions, leave said first polymerization zone and enter the second of said polymerization zones (downcomer) through which they flow in a densified form under the action of gravity, leave said second polymerization zone and are reintroduced into said first polymerization zone, thus establishing a circulation of polymer between the two polymerization zones. Generally, the conditions of fast fluidization in the first polymerization zone is established by feeding the monomers gas mixture below the point of reintroduction of the growing polymer into said first polymerization zone. The velocity of the transport gas into the first polymerization zone is higher than the transport velocity under the operating conditions and is normally between 2 and 15 m/s. In the second polymerization zone, where the polymer flows in densified form under the action of gravity, high values of density of the solid are reached which approach the bulk density of the polymer; a positive gain in pressure can thus be obtained along the direction of flow, so that it becomes possible to reintroduce the polymer into the first reaction zone without the help of mechanical means. In this way, a "loop" circulation is set up, which is defined by the balance of pressures between the two polymerization zones and by the head loss introduced into the system. Optionally, in the polymerization process means are provided which are capable of totally or partially preventing the gas mixture present in the raiser from entering the downcomer so that a gas and/or liquid mixture having a composition different from the gas mixture present in the raiser is introduced into the downcomer. Said process is described in the International patent application WO00/02929. Optionally, one or more inert gases, such as nitrogen or an aliphatic hydrocarbon, are maintained in the polymerization zones, in such quantities that the sum of the partial pressures of the inert gases is preferably between 5 and 80% of the total pressure of the gases. The operating parameters are those that are usual in gas-phase olefin polymerization processes, for example the temperature is normally in the range of from 50° C. to 120° C. The process can be carried out under operating pressure of between 0.5 and 10 MPa, preferably between 1.5 and 6 MPa Preferably, the various catalyst components are fed to the first polymerization zone, at any point of said first polymerization zone. However, they can also be fed at any point of the second polymerization zone. Molecular weight regulators known in the art, particularly hydrogen, can be used to regulate the molecular weight of the growing polymer. In the second stage, the component (2) is produced in a conventional fluidized-bed gas-phase reactor in the presence of the polymeric material and the catalyst system coming from the preceding polymerization step. The polymerization mixture is discharged from the downcomer to a gas-solid separator, and subsequently fed to the fluidized-bed gas-phase reactor operating under conventional conditions of temperature and pressure.

Further methods for preparing the heterophasic polypropylene composition (A) are described in the International patent application WO2005/014713.

The heterophasic polypropylene composition (A) may further comprise additives commonly employed in the polyolefin field, such as antioxidants, light stabilizers, nucleating agents, antiacids, colorants and fillers.

The polyolefin composition comprises from 65 to 90 wt %, preferably from 73 to 87 wt %, more preferably from 78 to 85 wt % of the component (A) and from 10 to 35 wt %, preferably from 13 to 27 wt %, more preferably from 15 to 22 wt % of the component (B). Said component (B) is preferably calcium carbonate.

The component (B) is added to the heterophasic polypropylene composition (A) either in powder or in granular form, wherein the granular particles may be coated, typically stearic-acid coated, or uncoated. Alternatively, the component (B) may be added as masterbatch composition. By masterbatch composition is meant herein a composition comprising high amounts of calcium carbonate, talc, wollastonite or mixtures thereof finely dispersed into a polymeric matrix.

The single- or multilayer threaded pipes according to the present invention are produced in a conventional manner, namely by extrusion under high shear conditions either in a single or twin-screw extruder. The components (A) and (B) may be pre-mixed in a conventional compounding unit to obtain pellets to be fed to the extruder. Alternatively, they may be metered simultaneously or separately directly to the extruder, into the same or different sections of the equipment (direct extrusion). The extrusion (melt) temperature normally ranges from 180° to 250° C. The extruded pipe is normally fed to a calibrating/cooling unit, cut to the desired length and subsequently fed to a conventional threading unit. Customary additives for pipes, such as colorants and fillers, may be optionally added to the molted blend during extrusion.

The single or multilayer threaded pipes of the present invention are described with reference to the attached figures, which are given for illustrative purpose and not to limit the invention.

Figure 1:
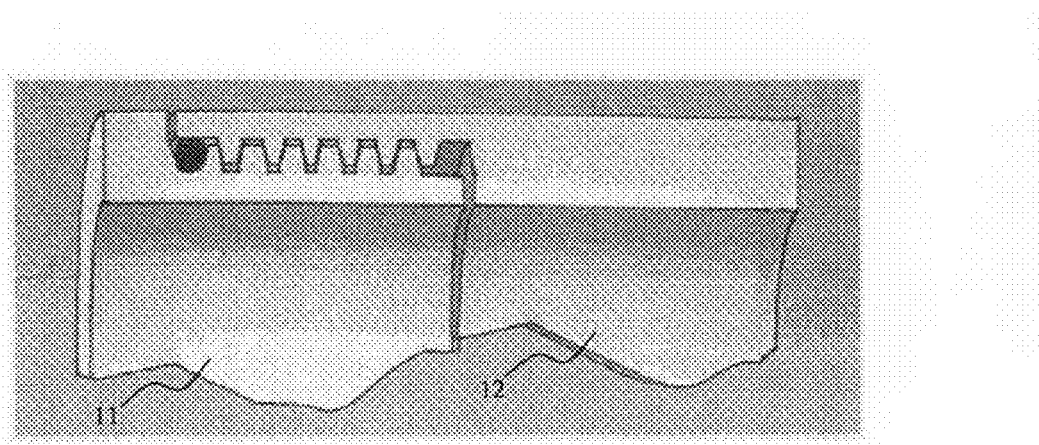
FIG. 1 is a representation of a preferred thread junction for the threaded pipes of the present invention.

The single- or multilayer threaded pipes of the present invention have at least one threaded section at one end. The threaded section may have any thread profile conventionally used for threaded pipes, i.e. trapezoidal, rectangular or rounded. The thread profile can be either "tongue" (bolt thread), with projecting ribs on the edge of the outer pipe wall, as the thread profile (11) in FIG. 1 or "groove" (nut thread), with grooves on the edge of the inner pipe wall, as the thread profile (12).

Figure 2:
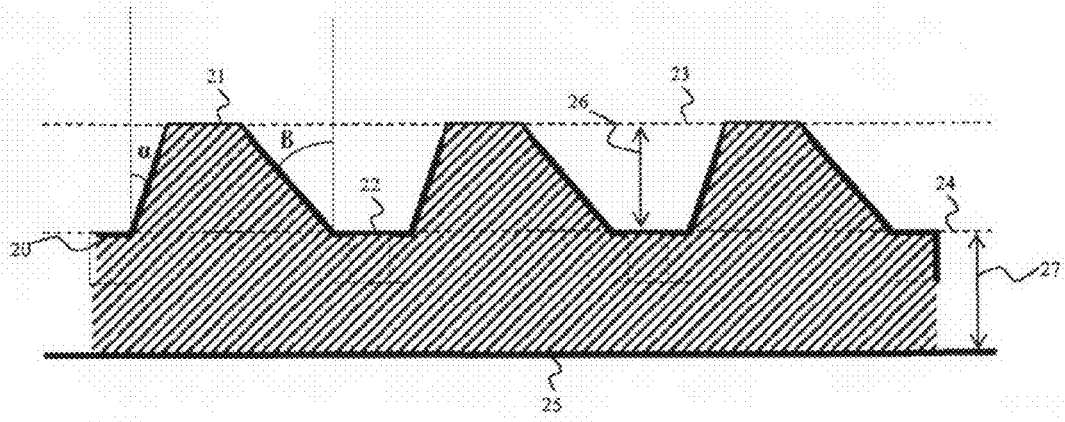
FIG. 2 is a representation of a preferred embodiment of the trapezoidal thread profile of the threaded pipes of the invention.

In a first preferred embodiment, said at least one thread profile of the single- or multilayer threaded pipes of the invention is trapezoidal with flat crests and roots. Referring to FIG. 2, each crest (21) of the trapezoidal thread profile (20) lays in plane (23) and each root (22) lays in plane (24). Said planes (23) and (24) are preferably parallel to the pipe wall (25). The angles alpha ($\alpha$) and beta ($\beta$), formed by the oblique sides of each trapezoidal rib with planes perpendicular to said plane (24), can be equal or different from each other and vary independently from 0.1° to 45°. Preferably, the angles $\alpha$ and $\beta$ are equal. According to a further preferred embodiment, the trapezoidal thread profile of the threaded pipes of the present invention conforms to that described DIN norm 103, Part 1 (April 1977).

In a second preferred embodiment said at least one thread profile has rectangular crests and roots.

The tongue thread profile of the pipes of the invention preferably have a residual wall thickness $e_t$ (27) from 7% to 65% with respect to the mean wall thickness, preferably from 10% to 40%. The groove thread profile may have a residual wall thickness $e_g$ (27) from 25% to 70%, preferably from 30% to 45% with respect to the mean wall thickness $e_n$. For the scope of the present invention, the residual wall thickness is defined as the arithmetical mean of measurements of the wall thickness in correspondence to the roots of the thread profile, regularly spaced around the circumference and in the same cross section of the thread profile and the mean wall thickness is defined as the arithmetical mean of a number of measurements of the wall thickness, regularly spaced around the circumference and in the same unthreaded cross section of a pipe.

The value of the thread depth H (26) of the threaded profile varies according to the mean wall thickness of the pipe and to the residual wall thicknesses of the groove and/or tongue profile(s); said value can be derived from the following equation (I):

$$e_g + e_t + H \leq e_n \qquad (I)$$

For pipes having one tongue profile at one end and one groove profile at the other end, the sum of the thread depth H and of the residual wall thicknesses of the tongue and groove profiles in equation (I) equals the mean wall thickness of the pipe.

The width of crests and roots can be equal or different. Each crest (21) and each root (22) is, independently to each other, equal to or greater than 2.0 mm in width, particularly preferably is from 2.0 to 20.0 mm, more preferably from 2.0 to 10.0, particularly preferably from 2.5 to 4.0 mm. Typically, all crests of the thread profile have the same width and all roots of the profile have the same width. The width of crests is measured on the top of the projecting ribs and the with of roots is measured at the bottom of the grooves.

The nominal outside diameter of the threaded pipes of the instant invention normally ranges from 50 to 2000 mm, preferably from 100 to 1000 mm, more preferably from 110 to 500 mm. For the scope of the present invention the nominal outside diameter $d_n$ is a convenient round number approximately equal to the value of the manufacturing outside diameter, the manufacturing outside diameter being defined as the value of the measurement of the outside diameter through the cross section at any point of a pipe.

The threaded profile can have any desirable length, preferably said length is comprised in the range from 55.0 to 75.0 mm.

The length of the threaded pipes of the instant invention is not intrinsically critical, however the threaded pipes of the invention are normally 3.0 to 5.0 m in length.

Preferably, the single- or multilayer threaded pipes of the present invention have a SDR (Standard Dimension Ratio) value from 5 to 33, more preferably the SDR value ranges from 17 to 25. The SDR (Standard Dimension Ratio) is the ratio of the nominal outside diameter to the minimum wall thickness. The minimum wall thickness is the measured minimum value of the wall thickness in a given cross section of the pipe.

Pipes sealing elements (O-rings), pipe thread protectors and screw-thread reinforce rings may be optionally present.

The Tensile Stress at Yield and at Break (measured according to the ISO norm 527) of the polyolefin composition from which the single- or multilayer threaded pipes of the invention are produced decrease while increasing the amount of the component (B) into said composition. It has been surprisingly found that the unthreading strength of the threaded pipes of the present invention produced from said polyolefin composition, comprising the heterophasic composition (A) in combination with specific amounts of the component (B), is particularly high and increases with the increasing of the amount of the component (B) into the polyolefin composition.

By unthreading strength is meant herein the maximum value of the force applied to cause the complete release of the screw thread of a threaded pipe connected with a tongue-and-groove joint. For the purpose of the present invention the unthreading strength is measured according to the method described herein below. The unthreading strength of the pipes of the invention is preferably higher than 6200 N, more preferably higher than 7500 N.

The Ring Stiffness (SN) of the threaded pipes of the instant invention increases as the amount of component (B) in the polyolefin composition increases. If compared to customary polypropylene pipes having the same SN values, i.e. the same strength performances, the threaded pipes of the invention may have thinner walls. Thus, the manufacturing of the threaded pipes of the invention may require less polymeric material, representing a cost effective improvement over customary polypropylene pipes. The value of the Ring Stiffness of the single- or multilayer threaded pipes of the present invention is preferably higher than 24.0 kN/m$^2$; the SN value is preferably higher than 24.0 kN/m$^2$ also in correspondence to the threaded section of the threaded pipes of the invention.

Preferably, the threaded pipes of the present invention are single-layer pipes.

According to a particularly preferred embodiment, the threaded pipes of the present invention are single-layer pipes having two threaded ends, characterized by the following set of properties:

the threaded profile can be independently selected from the group consisting of tongue profile and groove profile; and the thread profiles are independently selected from the group consisting of rectangular profile and profile conforming to that described in DIN norm 103—Part 1 (April 1977); and the nominal outside diameter ($d_n$) ranges from 110 to 200 mm; and the mean wall thickness ranges from 7.0 to 11.0 mm; and the residual wall thickness of the thread profile ranges from 2.00 to 4.50 mm when the thread profile is a tongue joint and from 2.40 to 5.00 mm when the thread profile is a groove joint; and the thread depth of the profile is of 2.00 mm for threaded pipes having 110 mm$\leq d_n \leq$140 mm and of 2.6 mm for threaded pipes having 140 mm$\leq d_n \leq$200 mm; and the projecting ribs of the thread profile are preferably 2.9 mm in width and the grooves are 3.1 mm in width.

Preferably, the thread profile is formed by 9 ribs and 9 grooves. The SDR value of said single-layer pipes of the particularly preferred embodiment ranges from 15 to 29, preferably from 21 to 23. The thread depth and of the residual wall thicknesses of the tongue and/or groove profiles of the single-layer pipes of the particularly preferred embodiment should preferably satisfy the equation (I).

The single- or multilayer threaded pipes of the invention may conveniently be used either for pressure or pressureless (gravity) applications. When used as wall-pipes for the drainage of underground waters, the single- or multilayer threaded pipes of the invention are preferably produced from a polyolefin composition having density (volumetric mass) equal to or higher than 0.95 Kg/dm³, preferably equal to or higher than 1.00 Kg/dm³.

The following examples are given to illustrate and not to limit the present invention.

EXAMPLES

The data of the propylene polymer materials and of pipes were obtained according to the following methods:

Xylene-Soluble Faction (X.S.)

2.5 g of polymer and 250 mL of o-xylene are introduced in a glass flask equipped with a refrigerator and a magnetical stirrer. The temperature is raised in 30 minutes up to the boiling pint of the solvent. The so obtained solution is then kept under reflux and stirring for further 30 minutes. The closed flask is then kept for 30 minutes in a bath of ice and water and in thermostatic water bath at 25° C. for 30 minutes as well. The solid thus obtained is filtered on quick filtering paper and the 100 ml of filtered liquid is poured in a previously weighed aluminum container, which is heated on a heating plate under nitrogen flow, to remove the solvent by evaporation. The container is then kept on an oven at 80° C. under vacuum until constant weight is obtained. The residue is weighed to determine the percentage of xylene-soluble polymer. The xylene insoluble fraction is calculated by difference with respect to the initial sample weight.

Comonomer content: by IR spectroscopy.

Molar ratio of feed gasses: by gas-chromatography

Split: the split is the amount of polymer produced in the concerned polymerization step, referred to the total amount of the polymer composition.

Melt flow rate (MFR): according to ISO 1133

Intrinsic viscosity: determined in tetrahydronaphthalene at 135° C.

Polydispersity Index (PI)

Determined at a temperature of 200° C. by using a parallel plates rheometer model RMS-800 marketed by Rheometrics (USA), operating at an oscillation frequency which increases from 0.1 rad/sec to 100 rad/sec. From the crossover modulus one can derive the P.I. by way of the equation:

$$P.I.=10^5/Gc$$

in which Gc is the crossover modulus which is defined as the value (expressed in Pa) at which G'=G" wherein G' is the storage modulus and G" is the loss modulus.

Flexural and tensile modulus: according to ISO 178

Stress at yield and at break, Elongation at yield (on the polyolefin): according to ISO 527.

Notched IZOD Impact Strength: according to ISO 180/1A

Stress and elongation at break on pipes: according to ISO 6259-1/3

Ring Stiffness: according to ISO 9969, 3% deflection of external diameter, at a deflection speed of 5 mm/min.

Unthreading Strength

The unthreading strength is measured according to the following method. Two cut-down sizes of a pipe having an nominal outside diameter of 160 mm, each cut-down size having a length of 200 mm, are joined with a threaded tongue-and-groove joint with a thread profile according to DIN 4925—Part 2 (1994) having:
thread depth of 2.6 mm;
9 ribs and 9 grooves;
projecting ribs of 2.9 mm in width;
grooves of 3.1 mm in width.

A metallic pin is inserted into a pinhole centered at 100 mm from the edge of each cut-down size of the pipe and the two cut-down sizes are pulled apart at a constant rate of 10 mm/min. The applied force is measured with a dynamometer (Zwick) at 23±2° C. The test is run on three specimens for each sample, the value of the unthreading strength being the arithmetical mean value on the three runs.

Impact test on pipes: according to UNI EN 744 (weight=3.750 Kg, high=2 m, semispherical steel dart Ø 25 mm). The number indicates the number of consecutive strokes causing 0 breaks into the test specimens.

Preparation of the Catalyst

The solid catalyst used in the examples was prepared according to the Example 1 of the International Patent Application WO2005/014713.

Polymerization

The heterophasic polypropylene composition (A) was prepared by polymerizing propylene and ethylene in the presence of Triethylaluminium (TEAL) as co-catalyst and dicyclopentyldimethoxysilane (DCPMS) as external donor. The weight ratio TEAL/DCPMS is 3 and the weight ratio TEAL/catalyst component is 5.

The polymerization was carried out in two reaction steps, wherein a propylene homopolymer (the component (1)) was produced by a gas-phase polymerization process carried out in at least two interconnected polymerization zones as described in the European patent EP 782587 operating at conventional pressure; the propylene homopolymer was discharged from the first reactor, fed to a gas-solid separator and the solid fed to a fluidized-bed gas-phase reactor where an ethylene/propylene copolymer (the component (2)) was produced. The polymer particles exiting from the second polymerization step were subjected to a steam treatment to remove the unreacted monomers, dried and granulated in a conventional equipment. The operative polymerization conditions, the characteristics and the mechanical properties of the obtained polypropylene heterophasic composition are indicated on Table 1.

Examples 1 and 2

The heterophasic polypropylene composition was compounded with calcium carbonate in a customary compounding unit and then introduced into a parallel single-screw (Ø 75) pipe extruder (Bandera) operating under the conditions indicated on Table 3. The pipe was subsequently threaded in a conventional threading unit.

Comparative Example 1

The granulated polypropylene heterophasic composition was fed to the pipe extruder without adding the component (B) and the pipe was manufactured and threaded as described in examples 1 and 2.

The tensile properties of the heterophasic polypropylene composition (A) reported on Table 1 and of the polyolefin composition reported on Table 2 were tested on injection-molded bars prepared according to the methods ISO 294/1 and ISO 1873.

The characteristics of the pipes were measured on two cut-down sizes of single-layer threaded pipes having an nominal outside diameter of 160 mm joined with a threaded tongue-and-groove joint having a thread profile according to DIN 4925—Part 2 (1994), said threaded pipe being characterized by the following features:
thread depth of 2.6 mm;
9 ribs and 9 grooves;
projecting ribs of 2.9 mm in width;
grooves of 3.1 mm in width.

The features of the pipes of the examples 1 and 2 and of the comparative example 1, together with the mechanical properties are collected in Table 2.

TABLE 1

| Component (1) | | |
|---|---|---|
| Temperature | ° C. | 80 |
| H2/C3 | mol/mol | 0.06-0.08 |
| Split | wt % | 90 |
| MFR (230° C., 5 Kg) | g/10 min | 1.6 |
| P.I. | | 6.2 |
| X.S. | wt % | 1.6 |
| $[\eta]_1$ | dl/g | 3.2 |
| Component (2) | | |
| Temperature | ° C. | 70 |
| Split | wt % | 10 |
| C2−/C2− + C3− | mol/mol | 0.41 |
| C2 | wt % | 51 |
| $[\eta]_2$ | dl/g | 3.6 |
| Polypropylene composition | | |
| C2 | wt % | 5.1 |
| $[\eta]_1/[\eta]_2$ | | 0.89 |
| MFR (230° C., 5 Kg) | g/10 min | 1.3 |
| MFR (230° C., 2.16 Kg) | g/10 min | 0.3 |
| Flexural modulus (*) | MPa | 1848 |
| Tensile stress at yield (50 mm/min) (*) | MPa | 31.2 |
| Elongation at yield (50 mm/min) (*) | % | 8.5 |
| Notched Izod Impact Strength at 23° C. (*) | kJ/m² | 42 |
| at 0° C. (*) | kJ/m² | 26 |
| at −20° C. (*) | kJ/m² | 9 |

(*) values measured after 7 days

TABLE 2

| | | Ex. 1 | Ex. 2 | Comp. Ex.. 1 |
|---|---|---|---|---|
| Polyolefin composition's features | | | | |
| CaCO₃ | wt % | 20 | 30 | 0 |
| Density | Kg/dm³ | 1.076 | 1.171 | 0.919 |
| Flexural modulus (*) | MPa | 1651 | 1840 | 1444 |
| Tensile modulus (*) | MPa | 1604 | 1745 | 1413 |
| Stress at yield (*) | MPa | 22.5 | 20.3 | 28.0 |
| Elongation at yield (*) | % | 5.0 | 4.5 | 6.0 |
| Stress at break (*) | MPa | 18.3 | 16.8 | 23.1 |
| Pipes | | | | |
| External diameter | mm | 161.3 | 161.4 | 161.1 |
| Nominal outside diameter | mm | 160 | 160 | 160 |
| Mean wall thickness | mm | 8.4 | 9.0 | 8.5 |
| Minimum wall thickness | mm | 7.1 | 7.2 | 7.3 |
| SDR | | 22.5 | 22.2 | 21.9 |
| Residual wall thickness tongue | mm | 2.2 | 2.6 | 2.3 |
| groove | mm | 3.3 | 3.4 | 3.3 |
| MFR (230° C., 2.16 Kg) | g/10 min | 0.95 | 1.06 | 0.28 |
| Ring Stiffness (SN) on pipe | kN/m² | 25.87 | 36.29 | 23.51 |
| on pipe thread | kN/m² | 25.63 | 36.05 | 23.23 |
| Stress at break | MPa | 16.7 | 16.8 | 19.9 |
| Elongation at break | % | 108.18 | 148.12 | 60.56 |
| Impact test | strokes | 104 | 104 | 104 |
| Unthreading strength | N | 6510 () | 7769 () | 5912 |

(*) values measured after 48 hours
(**) the junction unthreaded without breaking the thread profile. At the end of the test it was possible to re-screw the tongue-and-groove joint.

TABLE 3

| Screw speed | rpm | 40 |
|---|---|---|
| Pressure | MPa | 15.5 |
| Speed | m/min | 0.60 |
| Extruder inlet temp. | ° C. | 40 |
| Extruder temperature (zones 1 to 5) | ° C. | 215 |
| Melt temperature | ° C. | 187 |
| Die temperature (zones A to F) | ° C. | from 200 to 220 |
| Cooling/calibrating units-pressure | MPa | −0.048 −0.025 |
| Cooling/calibrating units-temp. | ° C. | 22 |

The invention claimed is:

1. A single- or multilayer threaded pipe, wherein at least one layer is produced from a polyolefin composition comprising (percentages based as a sum of components (A) and (B)):
   (A) 73 to 87 wt % of a heterophasic polypropylene composition comprising (percentages based on the heterophasic polypropylene composition):
      (1) 65-95 wt % of a propylene homopolymer insoluble in xylene at 25° C. in an amount over 85 wt %, comprising a polydispersity index ranging from 4 to 13, and an intrinsic viscosity ($[\eta]_1$) value of over 2.2 dl/g; and
      (2) 5-35 wt % of an olefin polymer of ethylene with propylene or a $C_4$-$C_{10}$ alpha-olefin comprising an ethylene content ranging from 35 to 60 wt %, and an intrinsic viscosity of a fraction soluble in xylene ($[\eta]_2$) of at least 1.4 dl/g;
   wherein a ratio of the intrinsic viscosity value of the propylene polymer (1) to that of the olefin polymer (2) ($[\eta]_1/[\eta]_2$) ranges from 0.45 to 1.6; and
   (B) 13-27 wt % of at least one filler selected among calcium carbonate, talc, wollastonite, or mixtures thereof.

2. The single- or multilayer threaded pipe according to claim 1, wherein the at least one filler (B) is calcium carbonate.

3. The single- or multilayer threaded pipe according to claim 1, wherein the single- or multilayer threaded pipe comprises at least one thread profile, and the thread profile is trapezoidal comprising flat crests and roots.

4. The single- or multilayer threaded pipe according to claim 3, wherein the thread profile comprises angles α and β, wherein the angles α and β are formed by oblique sides of at least one trapezoidal rib.

5. The single- or multilayer threaded pipe according to claim 4, wherein the single- or multiplayer threaded pipe comprises planes perpendicular to a plane (24), and the planes perpendicular to the plane (24) vary independently from 0.1° to 45°.

6. The single- or multilayer threaded pipe according to claim 3, wherein the angles α and β are equal.

7. The single- or multilayer threaded pipe according to claim 3, wherein the at least one thread profile conforms to that described DIN norm 103, Part 1.

8. The single- or multilayer threaded pipe according to claim 3, the at least one thread profile is rectangular.

9. The single- or multilayer threaded pipe according to claim 3, further comprising a wall residual thickness of a tongue thread profile from 7% to 65%, with respect to a mean wall thickness.

10. The single- or multilayer threaded pipe according to claim 3, further comprising a residual wall thickness of a groove thread profile from 25% to 70%, with respect to a mean wall thickness.

11. The single- or multilayer threaded pipe according to claim 3, further comprising at least one crest and root, wherein the at least one crest and root is equal to or greater than 2.0 mm in width.

12. The single- or multilayer threaded pipe according to claim 1, further comprising a unthreading strength, wherein the unthreading strength is higher than 6200 N.

13. The single- or multilayer threaded pipe according to claim 1, wherein the pipe is a single-layer pipe.

14. A single-layer threaded pipe, wherein at least one layer is produced from a polyolefin composition comprising (percentages based as a sum of components (A) and (B)):
  (A) 73 to 87 wt % of a heterophasic polypropylene composition comprising (percentages based on the heterophasic polypropylene composition):
    (1) 65-95 wt % of a propylene homopolymer insoluble in xylene at 25° C. in an amount over 85 wt %, comprising a polydispersity index ranging from 4 to 13, and an intrinsic viscosity ($[\eta]_1$) value of over 2.2 dl/g; and
    (2) 5-35 wt % of an olefin polymer of ethylene with propylene or a $C_4$-$C_{10}$ alpha-olefin comprising an ethylene content ranging from 35 to 60 to 85 wt %, and an intrinsic viscosity of a fraction soluble in xylene ($[\eta]_2$) of at least 1.4 dl/g;
  wherein a ratio of the intrinsic viscosity value of the propylene polymer (1) to that of the olefin polymer (2) ($[\eta]_1/[\eta]_2$) ranges from 0.45 to 1.6; and
  (B) 13-27 wt % of at least one filler selected among calcium carbonate, talc, wollastonite, or mixtures thereof; the single-layer threaded pipe comprising two threaded ends, the single-layer threaded pipe further comprising:
  a threaded profile selected from the group consisting of tongue profile and groove profile;
  the thread profile comprise a rectangular profile, and conform to DIN norm 103—Part 1;
  a nominal outside diameter ($d_n$) ranging from 110 to 200 mm;
  a wall thickness ranging from 7.00 to 11.00 mm;
  a residual wall thickness of the tongue profile ranging from 2.00 to 4.50 mm and a residual wall thickness of the groove profile ranging from 2.40 to 5.00 mm;
  a thread depth of the threaded profile is of 2.00 mm for threaded pipes comprising 110 mm≦$d_n$≦140 mm, and of 2.6 mm for threaded pipes comprising 140 mm<$d_n$≦200 mm; and
  projecting ribs of the thread profile are 2.9 mm in width, and grooves are 3.1 mm in width.

15. The pipe of claim 1 wherein the heterophasic polypropylene composition has an MFR of 0.9 to less than 5.0 g/10 min.

16. The pipe of claim 14 wherein the heterophasic polypropylene composition has an MFR of 0.9 to less than 5.0 g/10 min.

* * * * *